United States Patent
Leonelli, Jr.

(10) Patent No.: US 11,076,075 B2
(45) Date of Patent: Jul. 27, 2021

(54) LENS ASSEMBLY FOR A MOTOR VEHICLE CAMERA MODULE

(71) Applicant: AUTOLIV ASP, INC., Ogden, UT (US)

(72) Inventor: Frank Paul Leonelli, Jr., Goleta, CA (US)

(73) Assignee: AUTOLIV ASP, INC., Ogden, UT (US)

( * ) Notice: Subject to any disclaimer, the term of this patent is extended or adjusted under 35 U.S.C. 154(b) by 167 days.

(21) Appl. No.: 15/903,743

(22) Filed: Feb. 23, 2018

(65) Prior Publication Data

US 2019/0268514 A1    Aug. 29, 2019

(51) Int. Cl.
*B60R 11/04* (2006.01)
*H04N 5/225* (2006.01)
*G02B 7/04* (2021.01)
*G02B 7/02* (2021.01)

(52) U.S. Cl.
CPC ........... *H04N 5/2254* (2013.01); *B60R 11/04* (2013.01); *G02B 7/021* (2013.01); *G02B 7/022* (2013.01); *G02B 7/026* (2013.01); *G02B 7/04* (2013.01)

(58) Field of Classification Search
CPC ........ H04N 5/2254; G02B 7/07; G02B 7/021; G02B 7/022; G02B 7/026; B60R 11/04
See application file for complete search history.

(56) References Cited

U.S. PATENT DOCUMENTS

| | | | | |
|---|---|---|---|---|
| 2006/0126194 A1* | 6/2006 | Kazama | ............ | G02B 7/006 359/811 |
| 2011/0080367 A1* | 4/2011 | Marchand | ............ | G06F 1/3215 345/174 |
| 2011/0097072 A1* | 4/2011 | Gottwald | ............ | G02B 7/021 396/529 |
| 2013/0329126 A1* | 12/2013 | Brodie | ............ | G02B 13/001 348/360 |
| 2015/0181086 A1* | 6/2015 | Pahlitzsch | ............ | H04N 5/2254 348/374 |
| 2016/0216474 A1* | 7/2016 | Kobayashi | ............ | G03B 11/00 |
| 2018/0303329 A1* | 10/2018 | Goldfain | ............ | A61B 3/12 |

* cited by examiner

*Primary Examiner* — Ephrem Z Mebrahtu
(74) *Attorney, Agent, or Firm* — Dickinson Wright PLLC

(57) ABSTRACT

A lens assembly includes a lens housing, a flexible washer, and a lens module. The flexible washer and the lens module are disposed within a tubular sidewall of the lens housing. The washer is disposed axially between a mating surface of the lens module and a base surface of the lens housing. The lens housing and lens module include corresponding threads, and rotation of the lens module along the threads of the lens housing adjusts the axial position and focus of the lens module. The washer is the only component axially between the lens module and the lens housing and directly contacts the base surface and the mating surface. When compressed, the washer exerts an axial force on the lens module and lens housing, such that the friction on the threads is increased and the lens module is held in place.

20 Claims, 6 Drawing Sheets

LENS ASSEMBLY FOR A MOTOR VEHICLE CAMERA MODULE

FIELD OF THE INVENTION

The invention relates to a lens assembly and, more particularly, to a lens assembly for a camera module for a motor vehicle.

BACKGROUND

Automotive camera modules may be used for various purposes, such as for assisting drivers in the detection of obstacles, animals, pedestrians, and other vehicle surroundings. Camera modules may be used as part of a driver-assist system or in autonomous vehicles.

Camera modules may typically include a lens assembly having a housing and an adjustable lens for mounting to the housing. The lens may be housed in its own housing and mounted to the base housing, which may in turn be mounted to the camera module.

The lens may be inserted into or onto the base housing and adjusted relative to the base housing to adjust the focus of the lens. The lens may be then be fixed in place relative to the base housing to maintain the focus of the lens.

In one approach to fixing the lens to the base housing, a set screw may be used to fix the lens in place. However, the tightening of the set screw to fix the lens in place can lead to manufacturing problems, such as where the lens focus may shift in response to tightening the set screw, thereby requiring the setscrew to be loosened and the lens to be readjusted to a correct focus. Subsequent tightening of the set screw may lead to the same problems, requiring repeated readjustment and retightening to achieve the desired focus.

In another approach, a set screw is not used, and a wave spring may be used. In this approach, the lens housing may include threading that cooperates with threading of the base housing, such that the lens housing may be threaded into the base housing, with the wave spring disposed between the lens housing and the base housing. In this approach, the wave spring provides a load on the threads to create friction on the threads and hold them in place. However, this approach could lead to debris on the camera sensor.

In another approach, a foam washer is used in addition to the wave spring to prevent debris from reaching the camera sensor during the lens focusing process. Debris may cause spots or artifacts on the image detected by the camera, thereby reducing the functionality of the camera.

However, the use of the foam washer in combination with the wave spring results in increased assembly time and material cost.

The present invention provides a lens assembly capable of locking focus and reducing debris, along with reduction production cost.

The object of the invention is achieved by a lens assembly and a method of manufacturing a lens assembly as described herein.

SUMMARY

A lens assembly is provided including a lens housing having a tubular sidewall defining an interior housing cavity and a central longitudinal axis. The assembly also includes a lens module including a lens, the lens module having a generally cylindrical shape defining a body, wherein the lens is axially and rotationally fixed to the body, the lens module being attached to the lens housing and disposed at least partially within the interior housing cavity.

The lens housing includes a base surface disposed within the interior cavity, the base surface oriented transverse to the central longitudinal axis. The lens module includes a mating surface disposed on the body of the lens module, the mating surface oriented transverse to the central longitudinal axis.

A flexible washer is disposed within the interior housing cavity between the base surface and the mating surface, the flexible washer being compressible in an axial direction, whereby compression of the flexible washer exerts an axial force against the base surface and the mating surface. Internal threads are disposed on an interior surface of the interior housing cavity. External threads are disposed on an exterior surface of the body of the lens module, wherein the lens module is releasably engaged with the lens housing via engagement between the external threads and the internal threads.

The lens module is rotationally and axially adjustable relative to the lens housing via the threads, wherein rotation of the lens module results in axial movement of the lens module. Rotation of the lens module in a first rotational direction moves the lens module in first longitudinal direction into the lens housing and increases axial compression of the flexible washer, and rotation of the lens module in a second rotational direction moves the lens module in a second longitudinal direction out of the lens housing and decreases compression of the flexible washer.

Rotation of the lens module adjusts a focus of the lens. Compression of the flexible washer exerts an axial force on the internal and external threads and increases friction between the threads, wherein the friction between the threads holds the threads in place relative to each other and the lens module in place relative to the lens housing. The flexible washer seals the mating surface of the lens module against the base surface of the lens housing.

The flexible washer may have an annular shape. The flexible washer may be resilient. The flexible washer may be made of cellular urethane foam.

The flexible washer may be the only component disposed between the base surface and the mating surface. The flexible washer may have a front surface and a rear surface, wherein the front surface directly contacts the mating surface of the lens module and the rear surface directly contacts the base surface of the lens housing.

In one form, compression of the flexible washer provides an axial force of 20-50 Newtons. In one form, the internal and external threads have a thread pitch of approximately 0.5 mm.

The lens module may include a body portion, the body portion having a first diameter portion and a second diameter portion that is smaller than the first diameter portion, the second diameter portion extending axially away from the first diameter portion. The mating surface may extend radially between the first diameter portion and the second diameter portion. The flexible washer may surround the second diameter portion. An inner diameter of the flexible washer may corresponds to the outer diameter of the second diameter portion.

A method for assembling a lens assembly may include the steps of: providing a lens housing having a tubular sidewall defining an interior housing cavity and a central longitudinal axis, wherein the lens housing includes a base surface disposed within the interior cavity, the base surface oriented transverse to the central longitudinal axis; inserting a flexible washer in a first axial direction into the interior housing cavity toward the base surface, wherein the washer has an inner diameter and an outer diameter, the flexible washer being compressible axially; inserting a lens module into the lens housing in the first axial direction toward the washer and the base surface of the lens housing, wherein the lens module includes a lens, the lens module having a generally cylindrical shape defining a body, wherein the lens is axially and rotationally fixed to the body; inserting a mating surface of the lens module toward the washer and the base surface of the lens housing; engaging external threads of the lens module with internal threads of the lens housing and, in response thereto, rotating the lens module relative to the lens housing and translating the lens module axially relative to the lens housing and the washer; compressing the washer axially between the base surface of the lens housing and the mating surface of the lens module, wherein the washer provides an axial reaction force on the lens housing and the lens module such that friction on the internal and external threads is increased; rotating and the translating the lens module into the lens housing and compressing the washer to a threshold position where the friction on the internal and external threads has reached a threshold level that retains the lens module in fixed position within the lens housing.

The method may further include rotating and translating the lens module further into the lens housing beyond the threshold position in the first direction to an intermediate position and increasing the compression on the washer and the friction on the threads; rotating and translating the lens module in a second axial direction opposite the first axial direction to a position axially between the threshold position and the intermediate position and decreasing the compression on the washer and decreasing the friction on the threads.

In one approach, the method may include measuring a focus provided by the lens during rotation and translation of the lens module and, in response to detecting a predetermined focus, stopping rotating and translation of the lens module.

In one approach, the washer directly contacts the lens module and the lens housing in the axial direction when compressed. In another approach, the washer directly contacts the lens module and the lens housing in a radial direction when compressed. In another approach, the washer completely seals the base surface of the lens housing to the mating surface of the lens module when compressed. In one form, the washer is made of cellular urethane foam.

In one form, a position of the lens module corresponding to the predetermined focus is located at a point where the washer exerts a sufficient axial force to frictionally retain the lens module relative to the lens housing.

BRIEF DESCRIPTION OF THE DRAWINGS

In the following the invention shall be illustrated on the basis of preferred embodiments with reference to the accompanying drawings, wherein.

DETAILED DESCRIPTION

Figure 1:
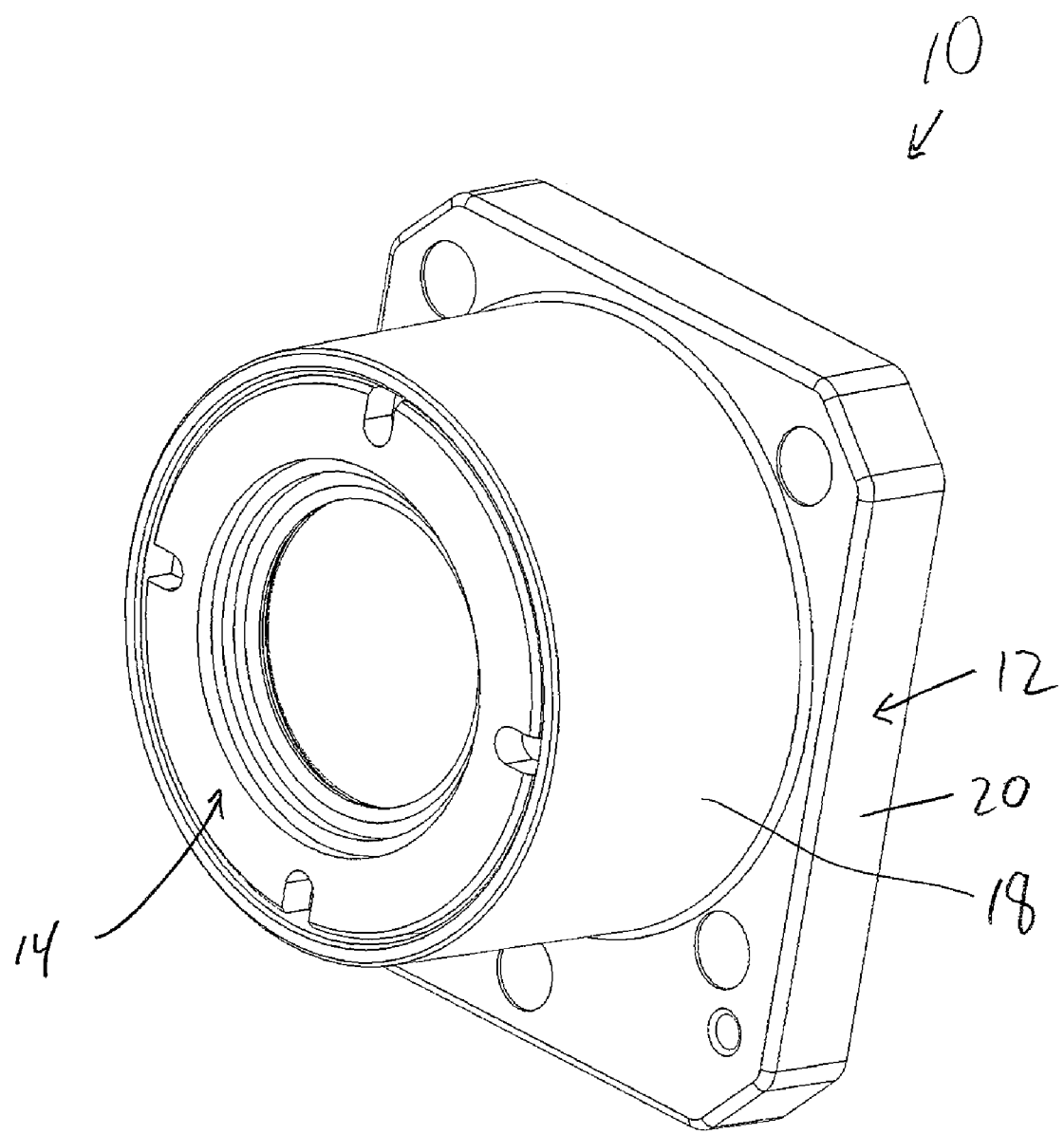
FIG. 1 is a front perspective view of a lens assembly.
Figure 2:
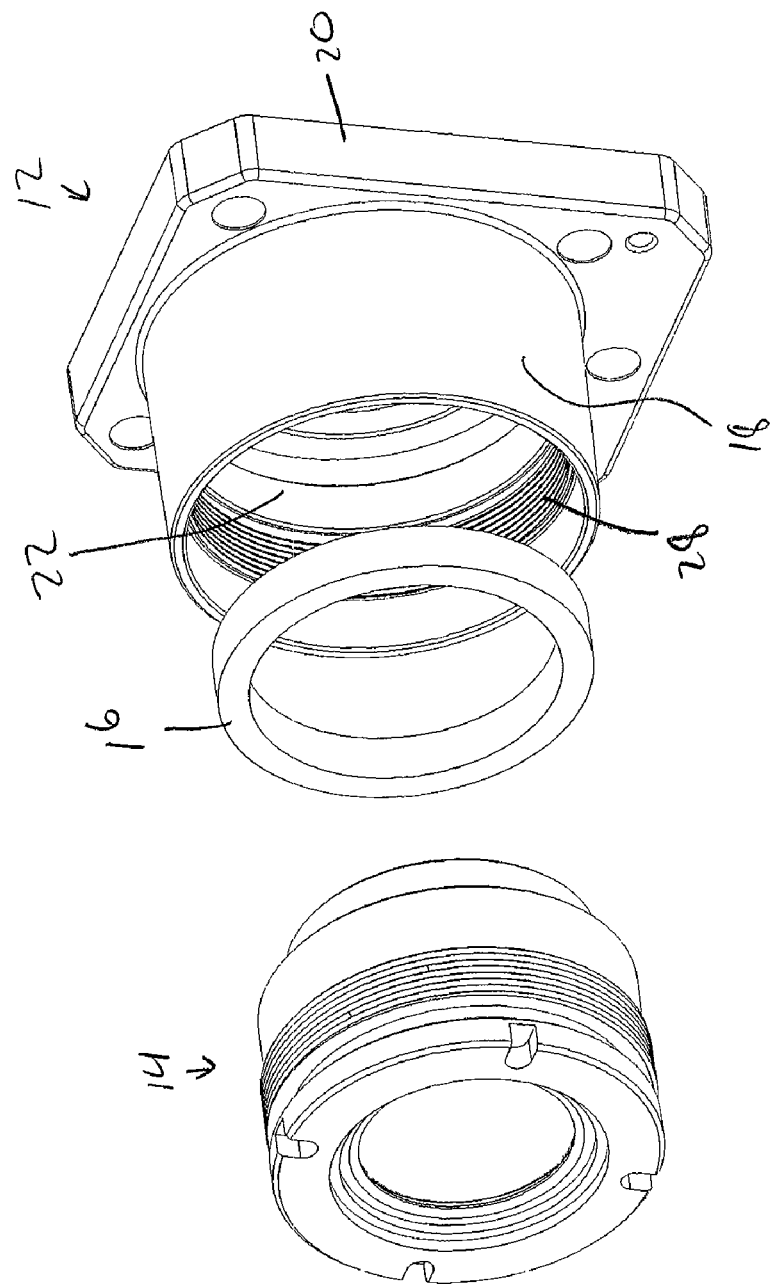
FIG. 2 is an exploded view of the lens assembly illustrating a lens module, a flexible washer, and a lens housing.

With reference to FIGS. 1 and 2, a lens assembly 10 is shown for assembly as part of a camera module (not shown), which may be mounted to a motor vehicle. It will be appreciated that the lens assembly 10 may also be used in other systems where cameras may be deployed. The lens assembly 10 may be used, in one example, for night vision and to detect infrared light, but may also be used in daylight conditions.

As shown in FIG. 2, the lens assembly 10 may include a lens housing 12 and a lens module 14. The assembly 10 may further include a flexible washer 16 configured for being compressed between the lens module 14 and the lens housing 12.

The lens housing 12 may include a body having a central longitudinal axis and defining a tubular sidewall 18 and a base 20, where the sidewall 18 extends axially away from the base 20 in a first axial direction. The sidewall 18 may define an internal cavity 22, in which the washer 16 and at least a portion of the lens module 14 are disposed.

Figure 3:
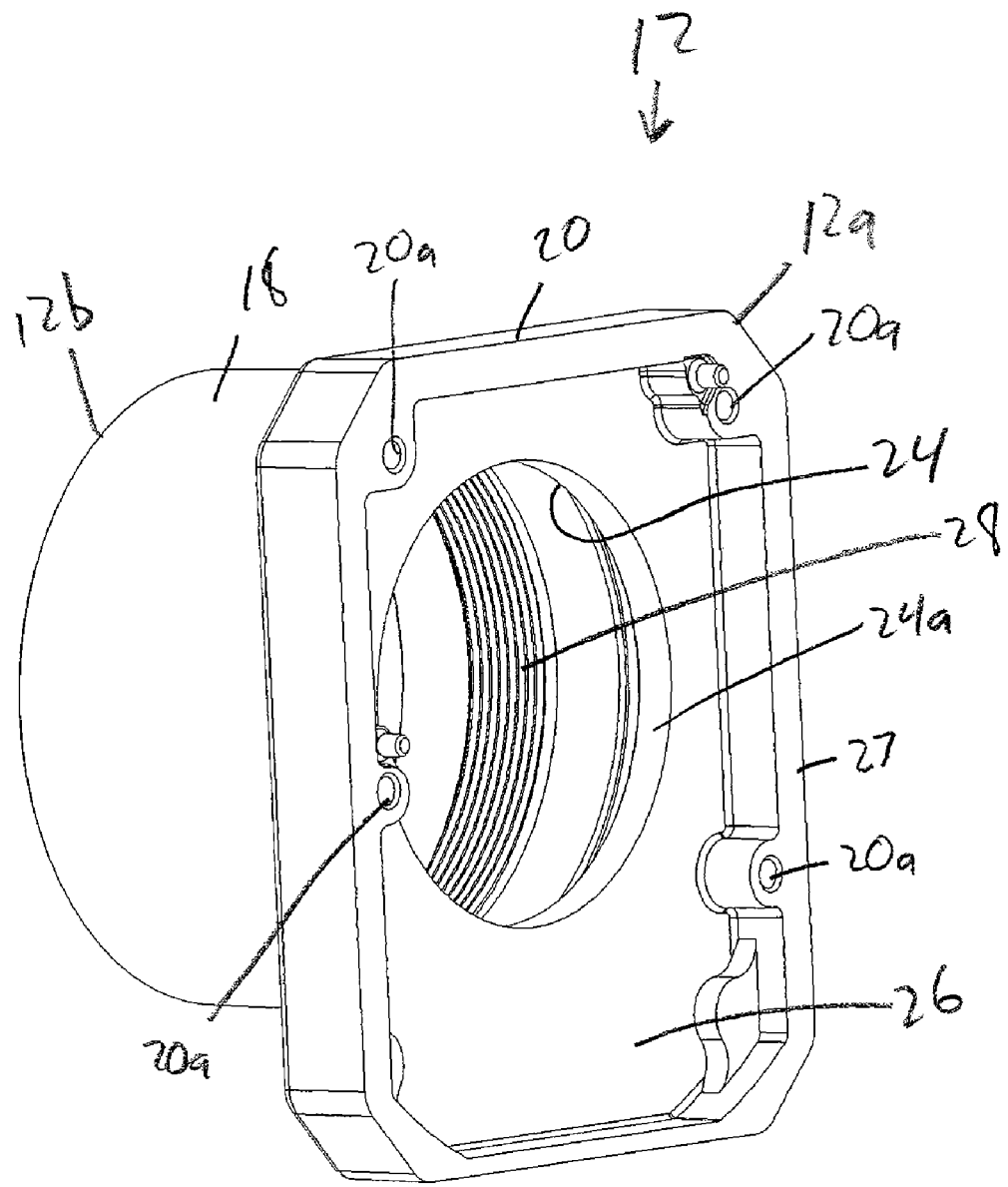
FIG. 3 is a rear perspective view of the lens housing.

With reference to FIG. 3, the lens housing 12 further defines a first end 12a and a second end 12b, with the base 20 defining the first end 12a and the sidewall 18 defining the second end 12b. The first end 12a and the second end 12b may each be in the form of openings, such that the first end 12a is configured to receive the washer 16 and the lens module 14, and the second end 12b is configured to be disposed adjacent to additional structure of the overall camera module, such as a shutter and camera sensor (not shown). The lens module 14 is thereby adjustable to focus light passing through the lens module 14 onto the sensor, such that the sensor can detect the images to be captured by the camera module.

Figure 4:
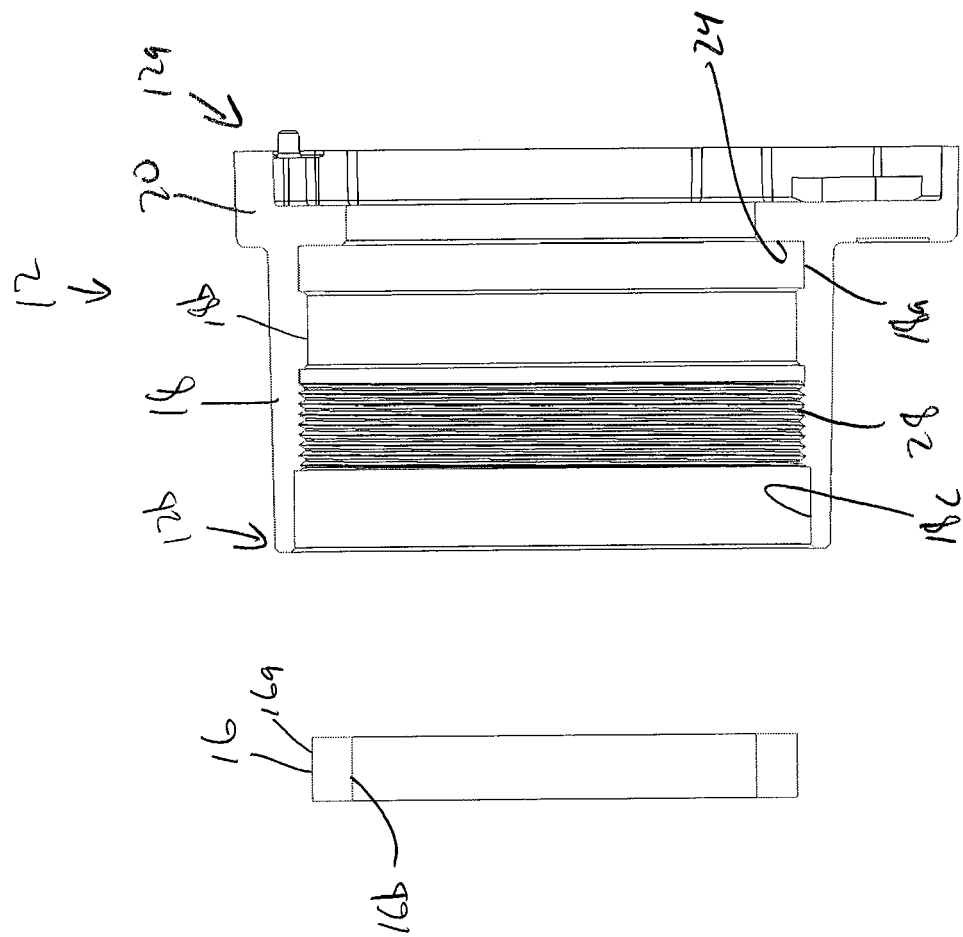
FIG. 4 is an exploded side cross-sectional view of the lens module, the washer, and the lens housing.
Figure 4:
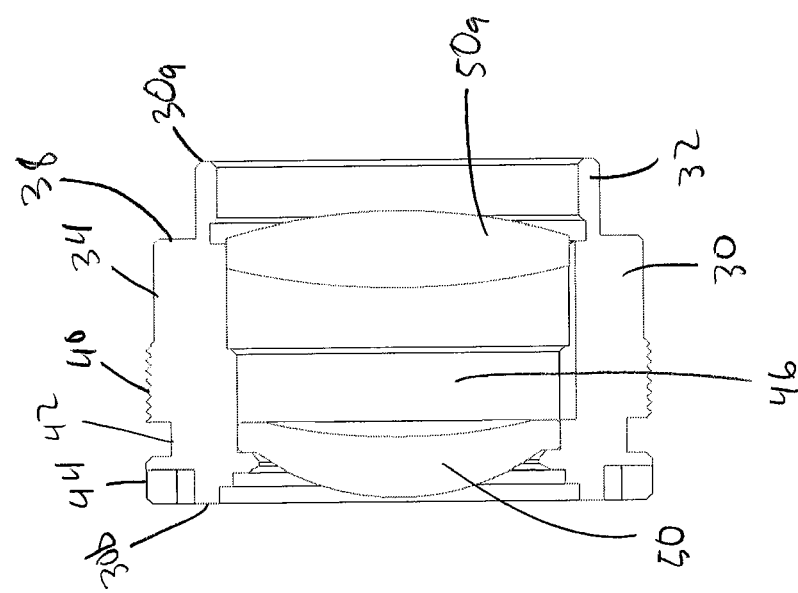

With reference to FIG. 4, the sidewall 18 of the housing 12 may have a generally cylindrical shape that defines a cylindrical inner surface extending axially from the second end 12b toward the base 20. The inner surface may thereby define a first inner diameter 18a of the lens housing 12 disposed adjacent the base 20. The inner diameters of the inner surface may vary along its length, and it should not be interpreted that the inner diameter of the inner surface is entirely constant. As shown in the Figures, the inner surface has different portions with different diameters.

As shown in FIGS. 3-6, the lens housing 12 further includes an inner base surface 24 disposed within the internal cavity 22. The base surface 24 is disposed adjacent the base 20 and at the bottom of the internal cavity 22, facing forward. The base surface 24 defines an opening 24a having a second inner diameter, where the second inner diameter defined by the base surface 24 is smaller than the first inner diameter 18a of the sidewall 18.

The base surface 24 is preferably configured for providing a surface against which the washer 16 may be placed and compressed when the lens assembly 10 is assembled. The base surface 24 thereby faces forward toward the second end 12b of the lens housing 12. The base surface 24 has a generally annular profile, similar to the shape of the washer 16.

As shown in FIG. 3, the base 20 may further define a bottom cavity 26 at the first end 12a of the lens housing 12. The bottom cavity 26 is defined by an outer sidewall 27 that surrounds the bottom cavity 26. The bottom cavity 26 provides a space into which additional camera module structure, such as a portion of a shutter assembly, may be installed to the lens assembly 10. The lens module 14 may also extend through the opening 24a defined by the base surface 24 a small distance, while allowing the lens module 14 to not extend beyond the first end 12a of the lens housing 12. The base 20 may further include mounting holes 20a for mounting the lens assembly 10 to the remainder of the camera module.

As shown in FIG. 4, the lens housing 12 further includes internal threading 28 on the inner surface of the sidewall 18. The internal threading 28 is configured to engage with corresponding threading on the lens module 14. The internal threading 28 may be disposed inboard from the second end 12b of the lens housing 12. The lens housing 12 may also include an annular protrusion 18b protruding radially inward from the inner surface of the sidewall 18, thereby creating a reduced inner diameter portion of the sidewall 18 at the location of the protrusion 18b.

The lens housing 12 may further include a third inner diameter 18c adjacent the second end 12b of the lens housing. The threading 28 is disposed axially between the third inner diameter 18c and the annular protrusion 18b. The third inner diameter 18c is greater than the diameter defined by the protrusion 18b.

Figure 5:
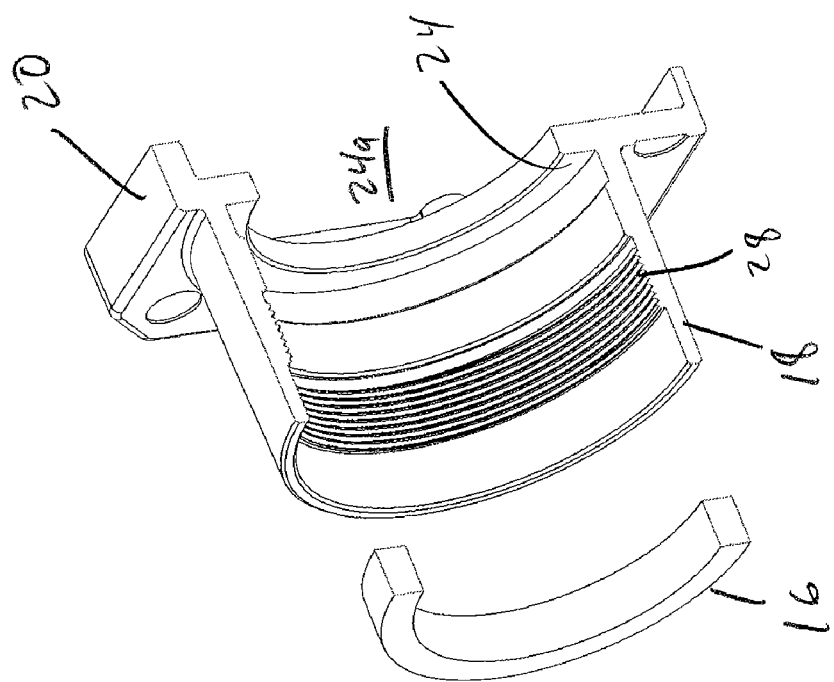
FIG. 5 is an exploded perspective cross-sectional view of the lens module, washer, and lens housing.
Figure 5:
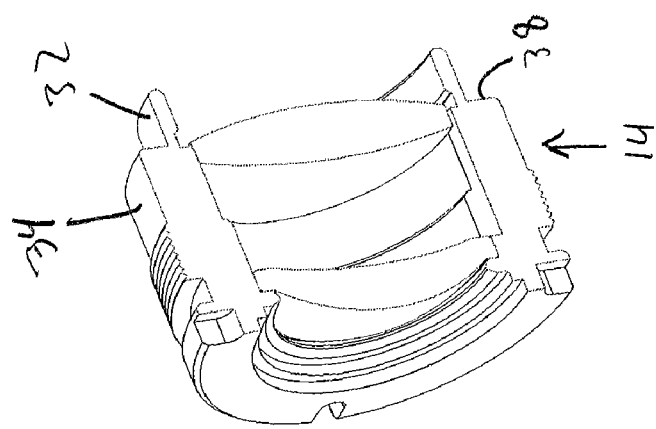

With reference to FIGS. 4 and 5, the lens module 14 is sized and configured to be received in the lens housing 12, with the washer 16 disposed between the lens module 14 and the lens housing 12. The lens module 14 may be threaded into the lens housing 12 and rotationally and axially adjusted relative to the lens housing 12 to adjust the focus of the lens module 14 relative to the sensor of the camera module when the lens assembly 10 has been attached to the sensor.

The lens module 14 includes a body 30 having a rear first end 30a and a front second end 30b. The first end 30a is the end closest to the base 20 of the lens housing 12 when assembled, and is the end that is inserted first into the sidewall 18 of the lens housing 12.

The body 30 has a generally cylindrical shape with varying diameters at different axial locations along the body 30. The body 30 may include a first diameter portion 32 adjacent the first end 30a. The first diameter portion 32 is sized and arranged to be slightly smaller than the inner diameter of the base surface opening 24a of the lens housing 12, such that the first diameter portion 32 can extend into the opening 24a defined by the base surface 24.

The body 30 further defines a second diameter portion 34 that is larger than the first diameter portion 32 and located axially adjacent the first diameter portion 32. Thus, the first diameter portion 32 is in the form of a boss that extends axially away from the second diameter portion 34 toward the first end of the 30a of the body. An annular mating surface 38 is disposed at the interface between the first diameter portion 32 and the second diameter portion 34. The annular mating surface 38 is arranged transverse and generally perpendicular to the longitudinal axis of the lens assembly 10 and extends radially outward from the end of the first diameter portion 32 to the adjacent end of the second diameter portion 34.

The annular mating surface 38 faces rearward toward the annular base surface 24 of the lens housing 12 when assembled. The washer 16 is disposed between the annular base surface 24 and the annular mating surface 38 when the lens assembly 10 is assembled, such that the washer 16 may be compressed there between.

The body 30 further includes external threading 40 disposed at the end of the second diameter portion 34 that is opposite the first diameter portion 32. The external threading 40 corresponds to the internal threading 28 on the sidewall 18 of the lens housing 12. The threading 40 extends radially outward from the second diameter portion 34, such that the maximum outer diameter of the threading 40 is greater than the second diameter portion 34. Accordingly, the second diameter portion 34 may pass through the internal threading and into the internal cavity 22, after which the external threading 40 will engage with the internal threading 28.

The external threading 40 may have an axial length that is smaller than the axial length of the internal threading 28. Accordingly, the lens module 14 is permitted a degree of axial travel while remaining threaded to lens housing 20 prior to bottoming out. Alternatively, the axial length of the external threading 40 may be the same as the length of the internal threading 28, or may even be longer that the internal threading 28, so long as there is space axially beyond the internal threading 28 to allow for the external threads 40 to move when the lens module 14 is threaded into the lens housing 12 past the end of the internal threads 28.

The body 30 further includes a third diameter portion 42 that is smaller than the second diameter portion 34. The third diameter portion 42 has an outer diameter than is smaller than the diameter of the external threads 40, such that as the lens module 14 is threaded into the lens housing 12, the external threads 40 may travel along the internal threads 28, leaving open internal threads behind the external threads 40 without the third diameter portion 42 contacting the internal threading 28.

The body may further include a fourth diameter portion 44 that is greater than the first, second, and third diameter portions 32, 34, 42. The fourth diameter portion 44 may correspond to the third inner diameter of the sidewall 18 of the lens housing, such that when the lens module 14 is installed into the lens housing 12, the fourth diameter portion 44 will substantially close off the lens assembly 10.

The lens module 14 further includes an internal cavity 46 defined within the body 30. The cavity 46 is open at the first end 30a, such that when the lens module 12 is assembled with the lens housing, the cavity 46 allows for light to pass through the lens module 14 to be received by the sensor of the camera module. The internal cavity 46 is described as being open, but may include a plurality of lens that also allow light to pass through, which may define distinct portions of the cavity 46.

The lens module 14 also includes a lens 50 attached at the second end 30b of the body 30, and may include additional lenses 50a being installed inboard of the lens 50 within the cavity 46. The lens 50 (and additional lenses 50a) is axially and rotationally fixed to the body 30, such that rotation of the body 30 within the lens housing 12 will rotationally and axially adjust the position of the lens 50 relative to the fixed housing 12 (and fixed sensor of the camera module). For the sake of discussion, the lens 50 and lenses 50a may be referred to collectively as the lens 50.

The lens 50 may be any known lens capable of use in camera or imaging systems. The lens 50 may be selected depending on the needs of the user. The lens 50 is preferably circular in shape, such that rotation of the lens module 14 will not affect the resulting view, and the resulting axial movement caused by rotation of the module 14 relative to the housing 12 will simply adjust the focus of the lens 50.

As shown in FIGS. 2 and 4-6, the washer 16 is disposed between the lens module 14 and the lens housing 12 as mentioned previously above. The washer 16 has an annular shape similar to the annular mating surface 38 and the base surface 24. The washer 16 may have an outer diameter 16a that corresponds to the inner diameter of the protrusion 18b of the sidewall 18 of the lens housing, such that the washer 16 can pass beyond the protrusion 18b during installation. The washer 16 may have an inner diameter 16a that corresponds to the outer diameter of the first diameter portion 32 of the body 30 of the lens module 14. The corresponding diameters need not be exactly the same, and preferably allow a nominal amount of play to account for tolerances and allowing the washer 16 to be able to receive the first diameter portion 32 of the lens module 14 and to be received in the sidewall 18 of the lens housing 12. One installed within the lens housing 12, the outer diameter 16*a* of the washer 16 may be spaced away from the inner diameter 18*a* of the sidewall 18, allowing the washer 16 to be able to flex toward the inner diameter 18*a* when compressed.

Figure 6:
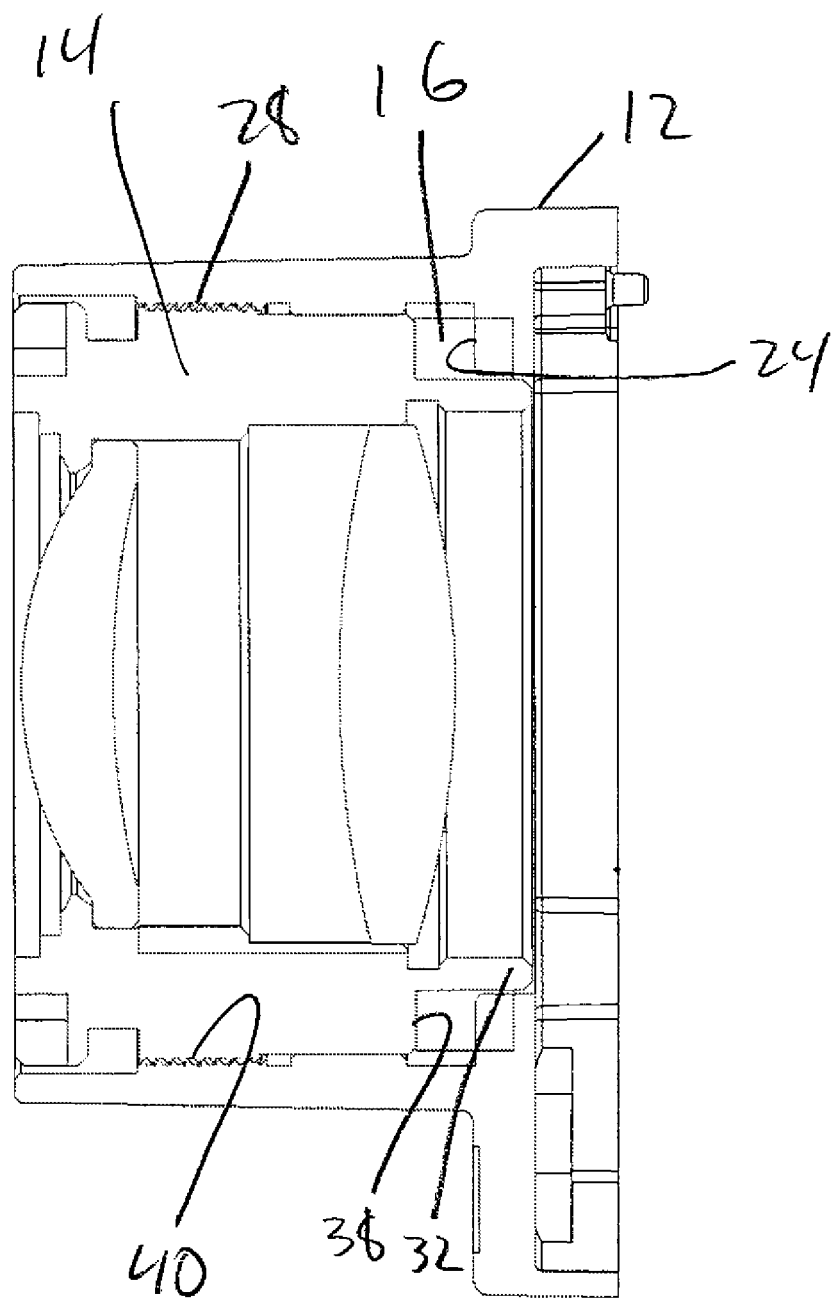
FIG. 6 is a side cross-sectional view of the lens assembly in an assembled state.

In one approach, the inner diameter 16*b* of the washer 16 may be slightly smaller than the inner diameter of the opening 24*a* defined by the base surface 24, such that when the washer 16 is disposed against the base surface 24, the waster 16 will overlap the edge of the opening 24*a* defined by the base surface 24, as shown in FIG. 6.

The washer 16 is preferably flexible and resilient, such that the washer 16 may be compressed, resulting in a reaction force acting against the base surface 24 and the annular mounting surface 38. Compression of the washer 16 will apply a force to the threads 28 and 40, increasing the friction on the threads to hold the lens module 14 in place relative to the lens housing 12. The washer 16 may be selected such that the reactive force in response to compression results in a range of forces that are sufficient to result in a sufficient amount of friction to hold the lens module 14 in place throughout a range of axial positions, thereby allowing for the focus of the lens 50 to be maintained at the desired axial position, when the desired axial position may not be known until assembly due to manufacturing tolerances.

The flexible and resilient nature of the washer 16 may allow for the lens 50 to be rotated beyond a desired axial position, and to be further rotated back to the desired axial position while maintaining a sufficient force on the threads to maintain the lens 50 in the ultimate desired position. In one example, the material of the washer 16 may be cellular urethane foam. One type of cellular urethane foam that may be is Poron, a tradename of Rogers Corporation. In one embodiment, compression of the washer 16 provides an axial force of 20-50 Newtons.

As shown in FIG. 6, when assembled, the washer 16 may be the only structure disposed between the lens module 14 and the lens housing 12. Put another way, the washer 16 directly contacts the base surface 24 and directly contacts the annular mounting surface 38. The washer 16 may also directly contact the inner diameter 18*a* of the sidewall 18 and the outer diameter 32 of the lens module 14. In this approach, there is no separate spring or similar component that provides the force to hold the threads in place relative to each other.

In addition to providing the force to hold the lens module 14 in place relative to the lens housing 12, the washer 16 also provides a sealing function to the lens assembly 10, preventing debris from passing through the base 20 and reaching the sensor of the camera module. The washer 16 surrounds the first diameter portion 32 and has an inner diameter that generally corresponds to the outer diameter of the first diameter portion 32, such that when the washer 16 is compressed, the path through the opening defined by the base surface 24 is blocked.

In an assembled state of the lens assembly 10, the lens module 14, washer 16, and lens housing 12 are held together as a single module or single unit, capable of being mounted or attached to, or assembled with, a remainder of a camera module system having imaging sensors and other components that may capture an image view through the lens assembly 10.

As shown in FIG. 6, in the assembled state of the lens assembly 10, the lens module 14 is received within the lens housing 12. The washer 16 is also received within the lens housing, and disposed between the lens housing 12 and the lens module 14. The lens module 14 is disposed radially within the lens housing 12. In one approach, when assembled the lens module 14 is disposed entirely radially within the lens housing 12. In another approach, the lens module 14 is disposed substantially radially within the lens housing 12, where a small portion of the lens module 14 may extend partially out of the end of the lens housing 12, depending on the amount of axial translation into the lens housing 12.

The washer 16 is disposed entirely radially within the lens housing 12. The washer 16 is also disposed entirely radially outward from the lens module 14. Thus, the washer 16 is radially between the lens module 14 and the lens housing 12. Additionally, the washer 16 is entirely disposed axially between the lens housing 12 and the lens module 14.

In the assembled state of the lens assembly 10, the washer 16 may directly contact the lens housing 12 and the lens module 14 in the radial direction when the washer 16 is compressed. The washer 16 will also directly contact the lens module 14 and the lens housing 12 in an axial direction when compressed in the assembled state of the lens assembly 10.

Assembling the lens assembly 10 can be accomplished quickly and easily, and with a reduced number of components relative to prior designs. To assemble the lens assembly 10, the lens housing 12, lens module 14, and washer 16 are provided. The lens housing 12 may be provided prior to being attached to additional camera module structure, or may be provided along with additional camera module structure after the lens housing 12 has been attached to the camera module structure. Indeed, even after the lens assembly 10 has been attached to the additional components of the camera, the lens module 14 could be removed from the lens housing 12, and replaced with a different lens module or be re-installed.

The washer 16 may be dropped into the lens housing 12 or otherwise inserted into the lens housing 12 through the open end 12*b* that that will also be used to receive the lens module 14. The washer 16 may be fully inserted into the lens housing 12 until the washer 16 axially abuts the lens housing 12 structure, in particular the base surface 24. The washer 16 may also be partially inserted into the lens housing 12, but not inserted axially against the lens housing 12. In this approach, the washer 16 is disposed generally perpendicular to the longitudinal axis of the lens housing 12. For example, the washer 16 may be inserted into lens housing 12 and left in place axially aligned with the protrusion 18*b*.

With the washer 16 fully or partially inserted into the lens housing 12 and oriented perpendicular to the axis, the lens module 14 is next inserted axially into the lens housing 12. The lens module 14 is inserted toward the washer 16 that is already disposed within the lens housing 12. The external threads 40 of the lens module 14 will engage with the internal threads 28 of the lens housing 12. Upon engagement of the threads, further insertion of the lens module 14 into the lens housing 12 will result in the lens module 14 rotating relative to the lens housing 12. Put another way, the lens module 14 is rotated and translated into the lens housing 12 after engagement between the threads.

As the lens module 14 is further inserted and rotated, the lens module 14 contacts the washer and is partially received within the washer 16, such that the washer 16 may radially surround the lens module 14. In particular, portion 32 of the lens module 14 is received in the washer 16, and the annular mounting surface 38 will contact the washer 16. As the lens module 14 is inserted and rotated, the washer 16 may rotate with the lens module 14, or the washer 16 may remain relatively rotationally stationary. Further insertion of the lens module 14 will push the washer 16 toward axial engagement with the lens housing 12 if the washer 16 is not already axially contacting the base surface 24 of the lens housing 12.

The lens module 14 will ultimately be inserted axially such that the washer 16 axially contacts both the lens housing 12 and the lens module 14 prior to substantial compression. In this state, the washer 16 is not compressed and does not exert an axial reaction force on the lens module 14. Thus, the lens module 14 is still susceptible to being unthreaded from the lens housing 12.

The lens module 14 may then be further inserted and rotated, compressing the washer 16. Compression of the washer 16 results in an axial force applied against the lens housing 12, as well as an axial force applied against the lens module 14. The force applied against the lens module 14 increases the friction between the respective threading of the lens module 14 and the lens housing 12. Further compression of the washer 16 increases the friction on the threading. In one example, the pitch on the respective threads of the lens module 14 and the lens housing 12 is 0.5 mm. When compressed, the washer 16 may provide an axial force of about 20-50 Newtons on the threads, which is sufficient to provide enough friction to hold the lens module 14 in place relative to the lens housing 12.

The lens module 14 may be inserted to a point such that the friction on the threading is sufficient to retain the lens module 14 relative to the lens housing 12, such that disengagement of the lens module 14 from the lens housing 12 will require an active rotational movement of the lens module 14 out of the lens housing. The point at which the lens module 14 is retained by the friction on the threads may be referred to as the threshold position.

The lens module 14 is then inserted and rotated further, beyond the threshold position. In one approach, the lens module 14 may be rotated at least one full rotation beyond the threshold position. Accordingly, the lens module 14 may be rotated back out of the lens housing 12 one full rotation, while remaining in a state such that the lens module 14 remains frictionally engaged with the lens housing 12. This subsequent further inserted position after the threshold position may be referred to as an intermediate position. The use of the term "intermediate" refers to the temporal position of the lens module 14 relative to the lens housing 12, and not a relative axial position, as will become apparent below.

With the lens module 14 in the intermediate position, the lens assembly 10 is in a condition where the lens module 14 may be rotationally adjusted to adjust the focus on the lens. The ideal focus position for the lens module 14 depends on the precise position of the sensor of the attached camera module components. Due to manufacturing tolerances, the desired focal position cannot be determined with precision, and typically requires axially adjustment of the lens module 14 relative to the sensor. The desired focal position will preferably fall axially between the threshold position and the intermediate position.

Thus, adjustment of the lens module 14 relative to the lens housing 12 to set the ideal focus will occur after the lens housing 12 has been attached to the sensor. The lens assembly 10, if it is not already attached to the sensor components of the camera module, is attached to the camera module components, including the image sensor. The camera module may be connected to imaging software or controls to evaluate the focus provided by the lens assembly 10.

The lens module 14 is then adjusted relative to the intermediate position. In particular, the lens module 14 is rotated such that the lens module 14 moves axially away from the sensor and in a direction opposite to the insertion of the lens module 14. The lens module 14 is adjusted, and the images provided by the lens module are evaluated by the image sensor and associated software. The lens module 14 is translated axially until such point as the desired focus is achieved. Achieving the desired focus may be done iteratively, such that the lens module 14 may be rotated out of the lens module 12 beyond the desired focal point, and then rotated back into the lens module 12 beyond the desired focal point, and so on until the desired focal point is determined.

In the event that the desired focal point is not located between the threshold position and the intermediate position, the lens module 14 may be rotated further into the lens housing 12 to a further intermediate position to increase the axial window in which the focal point may be identified. The above described process may be repeated until the desired focal point is found.

Once the desired focal point is found, the adjustment of the lens module 14 may be stopped. The lens module 14 does not need to be further fixed or held in place relative to the lens module 12, because the lens module 14 has been inserted beyond the threshold point, such that the axial force provided by the compression of the washer 16 exerts sufficient friction on the threads to hold the lens module 14 in place.

The above described assembly process can be achieved quickly and easily and with a reduced number of components relative to the prior designs. In each of the positions described above beyond the threshold position, the compression on the washer provides both a reaction force as well as a sealing function. With the desired focus relative to the sensor being achieved and retained, the lens module 10 and the attached sensor components may be installed to additional camera module components, such as an outer housing or additional control hardware, and the force provided by the washer 16 will keep the lens module 14 in the desired position relative to the sensor.

In the event the lens module 14 needs to be removed or replaced, the lens module 14 may be rotated back out of the lens housing 12, leaving the washer 16 in place. The washer 16 may also be removed or replaced, if desired. The lens module 14, or another lens module like it, can be inserted into engagement with the washer 16 again, and refocused as described above.

While the above description constitutes the preferred embodiment of the present invention, it will be appreciated that the invention is susceptible to modification, variation and change without departing from the proper scope and fair meaning of the accompanying claims.

What is claimed is:
1. A lens assembly comprising:
a lens housing having a tubular sidewall defining an interior housing cavity and a central longitudinal axis;
a lens module including a lens, the lens module having a generally cylindrical shape defining a body, wherein the lens is axially and rotationally fixed to the body, the lens module being attached to the lens housing and disposed at least partially within the interior housing cavity;

a base surface of the lens housing disposed within the interior cavity, the base surface oriented transverse to the central longitudinal axis;

a mating surface of the lens module disposed on the body of the lens module, the mating surface oriented transverse to the central longitudinal axis;

a flexible washer disposed within the interior housing cavity between the base surface and the mating surface, the flexible washer being compressible in an axial direction, whereby compression of the flexible washer exerts an axial force against the base surface and the mating surface;

internal threads disposed on an interior surface of the interior housing cavity;

external threads disposed on an exterior surface of the body of the lens module, wherein the lens module is releasably engaged with the lens housing via engagement between the external threads and the internal threads;

wherein the lens module is rotationally and axially adjustable relative to the lens housing via the threads, wherein rotation of the lens module results in axial movement of the lens module;

wherein rotation of the lens module in a first rotational direction moves the lens module in first longitudinal direction into the lens housing and increases axial compression of the flexible washer, and rotation of the lens module in a second rotational direction moves the lens module in a second longitudinal direction out of the lens housing and decreases compression of the flexible washer;

wherein rotation of the lens module adjusts a focus of the lens;

wherein compression of the flexible washer exerts an axial force on the internal and external threads and increases friction between the threads, wherein the friction between the threads holds the threads in place relative to each other and the lens module in place relative to the lens housing;

wherein the flexible washer seals the mating surface of the lens module against the base surface of the lens housing, wherein the lens module includes a body portion, the body portion having a first diameter portion and a second diameter portion that is larger than the first diameter portion, the first diameter portion of the lens module extending through an opening in a bottom of the interior housing cavity such that the flexible washer around the smaller diameter portion contacts the base surface, wherein the body portion of the lens module further includes a third diameter portion, which is smaller than the second diameter portion, and the third diameter portion is arranged in an opposite side from the first diameter portion in the central longitudinal axis.

2. The lens assembly of claim 1, wherein the flexible washer has an annular shape.

3. The lens assembly of claim 1, wherein the flexible washer is resilient.

4. The lens assembly of claim 1, wherein the flexible washer is made of cellular urethane foam.

5. The lens assembly of claim 1, wherein the flexible washer is the only component disposed between the base surface and the mating surface.

6. The lens assembly of claim 1, wherein the flexible washer has a front surface and a rear surface, wherein the front surface directly contacts the mating surface of the lens module and the rear surface directly contacts the base surface of the lens housing.

7. The lens assembly of claim 1, wherein compression of the flexible washer provides an axial force of 20-50 Newtons.

8. The lens assembly of claim 1, wherein the internal and external threads have a thread pitch of 0.5 mm.

9. The lens assembly of claim 1, wherein the first diameter portion extending axially away from the second diameter portion.

10. The lens assembly of claim 9, wherein the mating surface extends radially between the first diameter portion and the second diameter portion.

11. The lens assembly of claim 10, wherein the flexible washer surrounds the first diameter portion.

12. The lens assembly of claim 11, wherein an inner diameter of the flexible washer corresponds to the outer diameter of the first diameter portion.

13. A method for assembling a lens assembly, the method comprising:

providing a lens housing having a tubular sidewall defining an interior housing cavity and a central longitudinal axis, wherein the lens housing includes a base surface disposed within the interior cavity, the base surface oriented transverse to the central longitudinal axis;

inserting a flexible washer in a first axial direction into the interior housing cavity toward the base surface, wherein the washer has an inner diameter and an outer diameter, the flexible washer being compressible axially;

inserting a lens module into the lens housing in the first axial direction toward the washer and the base surface of the lens housing, wherein the lens module includes a lens, the lens module having a generally cylindrical shape defining a body, wherein the lens is axially and rotationally fixed to the body;

inserting a mating surface of the lens module toward the washer and the base surface of the lens housing;

engaging external threads of the lens module with internal threads of the lens housing and, in response thereto, rotating the lens module relative to the lens housing and translating the lens module axially relative to the lens housing and the washer;

compressing the washer axially between the base surface of the lens housing and the mating surface of the lens module, wherein the washer provides an axial reaction force on the lens housing and the lens module such that friction on the internal and external threads is increased;

rotating and the translating the lens module into the lens housing and compressing the washer to a threshold position where the friction on the internal and external threads has reached a threshold level that retains the lens module in fixed positon within the lens housing, wherein the lens module includes a body portion, the body portion having a first diameter portion and a second diameter portion that is larger than the first diameter portion, the first diameter portion of the lens module extending through an opening in a bottom of the interior housing cavity such that the flexible washer around the smaller diameter portion contacts the base surface, and wherein the body portion of the lens module further includes a third diameter portion, which is smaller than the second diameter portion, and the third diameter portion is arranged in an opposite side from the first diameter portion in the central longitudinal axis.

14. The method of claim 13, further comprising:
rotating and translating the lens module further into the lens housing beyond the threshold position in the first direction to an intermediate position and increasing the compression on the washer and the friction on the threads;
rotating and translating the lens module in a second axial direction opposite the first axial direction to a position axially between the threshold positon and the intermediate position and decreasing the compression on the washer and decreasing the friction on the threads.

15. The method of claim 13, further comprising measuring a focus provided by the lens during rotation and translation of the lens module and, in response to detecting a predetermined focus, stopping rotating and translation of the lens module.

16. The method of claim 13, wherein the washer directly contacts the lens module and the lens housing in the axial direction when compressed.

17. The method of claim 13, wherein the washer directly contacts the lens module and the lens housing in a radial direction when compressed.

18. The method of claim 13, wherein the washer completely seals the base surface of the lens housing to the mating surface of the lens module when compressed.

19. The method of claim 13, wherein the washer is made of cellular urethane foam.

20. The method of claim 15, wherein a position of the lens module corresponding to the predetermined focus is located at a point where the washer exerts a sufficient axial force to frictionally retain the lens module relative to the lens housing.

* * * * *